United States Patent [19]

Sugier

[11] 3,899,577

[45] Aug. 12, 1975

[54] CARBON MONOXIDE CONVERSION CATALYSTS

[75] Inventor: André Sugier, Rueil-Malmaison, France

[73] Assignee: Institut Francais du Petrole des Carburants et Lubrifiants, Rueil-Malmaison, France

[22] Filed: Oct. 2, 1973

[21] Appl. No.: 402,762

Related U.S. Application Data

[62] Division of Ser. No. 56,974, July 21, 1970, Pat. No. 3,787,332.

[30] Foreign Application Priority Data

July 25, 1969  France ............................ 69.25671

[52] U.S. Cl. ................................ 423/656; 423/437
[51] Int. Cl. ........................... C01b 1/03; C01b 1/08
[58] Field of Search ............................ 423/656, 437

[56] References Cited

UNITED STATES PATENTS

| 1,797,426 | 3/1931 | Larson | 423/656 |
| 1,809,978 | 6/1931 | Larson | 423/656 |
| 1,889,672 | 11/1932 | Larson | 423/656 |

FOREIGN PATENTS OR APPLICATIONS

| 961,860 | 6/1964 | United Kingdom | 423/656 |
| 1,085,717 | 10/1967 | United Kingdom | 423/656 |
| 1,213,343 | 11/1970 | United Kingdom | 423/656 |

OTHER PUBLICATIONS

Hackh's Chemical Dictionary by Julius Grant, 4th Ed., 1969, p. 630, McGraw–Hill Book Co., New York.

Primary Examiner—Edward Stern
Attorney, Agent, or Firm—Millen, Raptes & White

[57] ABSTRACT

This invention relates to a catalyst, to a process for the manufacture thereof and to a process for manufacturing hydrogen by reacting carbon monoxide with water at 150° – 550°C in the presence of the above catalyst. This catalyst comprises an active phase consisting of the mixed oxides of (a) copper and (b) a trivalent metal selected from aluminum, chromium, manganese, iron and cobalt, at least 60 percent by weight of said mixed oxides having a spinel structure. The catalyst is manufactured by admixing the catalyst components in solution with a heat-decomposable complexing organic compound or with a heat-decomposable gel-forming compound, the solvent being evaporated thereafter and the mixture being finally roasted at a temperature of at least 200°C.

19 Claims, No Drawings

CARBON MONOXIDE CONVERSION CATALYSTS

This is a division of application Ser. No. 56,974, filed July 21, 1970, now U.S. Pat. No. 3,787,332, issued Jan. 22, 1974.

This invention relates to a process for producing hydrogen from carbon monoxide and water according to the conversion reaction:

$$CO + H_2O \rightleftarrows CO_2 + H_2$$

Since this reaction is exothermic, the equilibrium displaced to the right when the temperature is decreased.

Up to now, two types of catalysts have been used in this reaction, one type used at a high temperature and the other type at a low temperature. The former have but a low activity at the low temperature; they are rather inexpensive; their use results in limited conversion rates owing to the unfavorable influence of temperature on the reaction balance. The other catalysts, which are active at a low temperature, are more expensive and weaker since they lose their activity when the temperature is increased too much.

This invention relates to new catalysts which may be used for converting carbon monoxide and steam to hydrogen. These catalysts may be used in a broad temperature range, usually 150° to 450°C and even, in particular cases, 150° to 550°C, which constitutes a substantial advantage.

These catalysts comprise at least one mixed oxide of formula $CuH_2O_4$ wherein M is a trivalent metal selected from the group consisting of aluminum, chromium, manganese, iron and cobalt, said oxide having, at least partly, a spinel structure.

In contrast to the known catalysts, which contain copper as an active element in the form of copper oxide admixed with other substances or deposited thereon, the catalysts of this invention contain copper associated with other elements in the form of chemical compounds of a well-defined composition and structure. It has unexpectedly been found that copper has an higher activity and a greater stability with respect to the carbon monoxide conversion, when it is part of a defined chemical compound of the spinel type, said compound having the general formula $Cu\ H_2O_4$ in which H is a trivalent metal selected from the group consisting of aluminum, chromium, manganese, iron and cobalt.

The present invention also applies to the catalysts whose active phase consists of mixed oxides in which copper is associated with at least two of the hereinbefore disclosed trivalent metals, said mixed oxides being at least partly of the spinel type.

The invention also relates to the catalysts whose active phase consists of mixed oxides in which copper and at least one other bivalent metal selected from the group consisting of magnesium, cobalt and cadmium are associated with at least one of the hereinbefore disclosed trivalent metals, said mixed oxides being at least partly of the spinel type.

The spinel content of the active phase may be determined by X-rays diffraction analysis since the spinels are oxygen-containing chemical compounds of a well-defined composition, i.e. they have a stoichiometric composition, taking into account the lattice defects. Their crystallographic phase is unique and may be characterized easily.

By active phase, there is meant the oxides of the above-mentioned trivalent and bivalent metals, as a whole, including copper, which are present in the catalyst.

It has been found that it was of major importance for the carbon monoxide conversion catalysts that copper be present in the cubic lattice of a spinel to obtain a high activity and, above all, a high stability of the catalysts. Copper must be located either in a tetrahedral system, in the case of a normal spinel, or in octahedral system, in the case of an inverted spinel.

It is thus preferred that the active phase have the highest possible spinel content. The most preferred catalysts have an active phase whose spinel content is at least 60 percent by weight.

The catalysts of this invention may be supported if desired. In that case, the carrier may be of any type known in catalysis, the preferred carriers having a substantial pore volume, for example at least 20 cubic centimeters per 100 grams of carrier.

For example, alumina, silica, silica-alumina, magnesia, silica-magnesia, metal aluminates and silicium carbide may be used as carriers.

A preferred carrier consists of alumina balls or extrudates of 2–5 millimeters length, said balls or extrudates having a specific surface of 100 to 350 sq. meters per gram and a pore volume of 40 to 65 ccm per 100 grams.

Another object of this invention is the manufacture of the thus defined catalysts. As a matter of fact, it has been found that the processes for manufacturing spinels do not all result in the same products and that, for example, the catalysts obtained by fritting oxides at a high temperature were less active than those obtained at a moderate or low temperature.

A known process for manufacturing mixtures of metal oxides which may be used at a low temperature consists of co-precipitating the hydroxides of the metals to be associated, either by adding a convenient chemical compound to a solution of the salts of these metals, or by adding such a solution to a solution of the said compound, and thereafter decomposing the obtained hydroxide mixture. However this method does not result in a sufficiently homogeneous mixture because a perfect coprecipitation cannot be obtained easily. One other disadvantage results from the use of, for example, sodium hydroxide or sodium carbonate as precipitating agent instead of ammonia when the hydroxides, for example copper hydroxide, are partly or completely soluble in ammonia. A careful washing of the hydroxides must follow since sodium is quite detrimental to the activity of such catalysts.

For manufacturing unsupported catalysts, this invention makes use of methods starting from a precursor containing the metal elements in a proportion substantially corresponding to the composition of the spinel phase. These precursors may be manufactured by a process which comprises admixing a gel-forming compound or a complexing compound to a solution of the metal ions to be associated in any convenient form, said compounds being heat-decomposable, preferably without residue. Thus a stable solution of the metal ions to be associated is manufactured and the solvent is removed thereafter without settling of the metal ions, which results in an extremely viscous composition which may be decomposed by heat.

To obtain an homogeneous mixed oxide, it is of major importance to avoid any segregation of the metal compounds in the solution and any separation of crystallized compounds; it is also important to obtain a solution of sufficiently high viscosity to avoid any further separation of the elements during the decomposition.

The elements to be associated in the precursor may be used as soluble salts which decompose under the conditions of manufacture to the final oxide, for example as nitrate, nitrite, sulfate, sulfite, thiosulfate, chloride, chlorate, chlorite, hypochlorite, perchlorate, carbonate, formate, acetate, propionate, methylate, ethylate, isopropylate, propylate or oxalate. Salts of acids containing one of the elements to be associated may also be used, for example chromates or bichromates. Finally an anhydride, an acid or a hydroxide in solution may also be used.

The salts may be dissolved either in a neutral, basic or acid aqueous solution or in a liquid other than water, for example a conventional solvent.

When a gel-forming substance is added to this solution, the obtained product consists of a prefectly homogeneous and transparent gel. The latter may be subjected to decomposition by heating at a temperature higher than 200°C, preferably 300° to 660°C. The oxides are obtained in the form of a very fine powder.

It must be pointed out that the gel results from a mechanism quite different from that conventionally employed in the manufacture of catalysts, wherein an alumina or silica gel, or a gel obtained from other metal hydroxides, either pure or intermixed, in added to a solution containing other elements: in the latter case, indeed, the gel-forming agent remains in the final product in the form of an oxide combined with the other oxides or intimately admixed therewith.

According to this invention, any substance which, when added to the metal salts solution, substantially increases the viscosity thereof, may be used as a gel-forming compound. By way of example, there will be used a gum, for example gum adraganth, senegal gum, shellac, gum Dammas, Carouba gum, or a gel-forming or thickening substance, for example alginic acid, an alginate, a polyvinyl alcohol, an urea-formaldehyde resin, a carboxyvinyl polymer, a polyethylene oxide, carboxy methylcellulose, methyl cellulose, a polyglycol, a polymethacrylate, a polyethanolamine, an oxide wax or a glue. The gel-forming substance may be selected in view of its stability in the presence of the ions which may be present in the solution. Senegal gum and gum adraganth give the best results.

When a complex-forming substance, which in able to decompose by heat, is added to a solution containing the metal elements to be associated, said substance may be selected from the group consisting of the polycarboxylic acids, the acids-alcohols, the acids-amines, the ketoacids and their salts. Said substance is used in an amount lower than 0.1 gram-equivalent, perferably 0.002 to 0.1 gram-equivalent, per gram-equivalent of the metal to be complexed.

Tartaric acid and citric acid, both aliphatic hydroxy carboxylic acids, may be used with benefit.

The resulting solution may be concentrated by vaporization, thus resulting in a very viscous homogeneous liquid or an amorphous solid which may be subjected to heat decomposition at a temperature higher than 200°C, preferably between 300° and 660°C.

The thermal decomposition of the precursor to an oxide may be carried out either directly or after drying. In that case, the drying may be carried out under reduced pressure or at any pressure, in the presence of air or any other gas. The thermal decomposition is itself carried out in air or in a reducing, oxidizing or neutral atmosphere.

A supported catalyst may be manufactured by impregnating a carrier such as defined herebefore by a method resulting in the formation of a spinel phase on the carrier from a mixed oxide precursor containing the metal elements to be associated in proportions substantially corresponding to the desired spinel phase.

The mixed oxide precursor may be obtained according to any one of the hereinbefore given methods for manufacturing unsupported catalysts.

Two embodiments may be used: a gel-forming substance or a complexing substance may be added to a solution of the metal compounds to be associated, which results in a precursor that may be used to impregnate the carrier. Alternatively the gel-forming substance or the complexing substance may be admixed with the carrier, and, after drying thereof, a solution of the metal compounds to be associated is added thereto.

The mixed oxide precursor which has thus been admixed with the carrier is thereafter subjected to thermal decomposition under the hereinbefore given conditions.

One further object of this invention is a process for producing hydrogen from carbon monoxide and water, said process comprising the use as catalyst of one of the hereinbefore defined compositions.

These catalyst compositions, which possess a high stability and a great activity, may be used in a broad temperature range, for example from 150° to 450°C and even 150° to 550°C when more than two metal elements are present.

The following examples are given for illustrative purposes and must not be considered as limiting the scope of the invention. Examples 1A, 1B, 5A and 9A are given for comparative purposes.

In these examples, the catalyst activity was determined as follows: the catalyst was introduced into a tubular oven of 20 mm diameter, said oven being maintained at a constant temperature under atmospheric pressure: a gaseous mixture of 20 percent by volume of carbon monoxide and 80 % by volume of hydrogen, together with steam in a ratio of 1 part by volume of steam per part by volume of gas, was passed therethrough. The hourly feed rate by volume (hourly volume of feed per volume of catalyst) was, except if otherwise stated, 2000 liters per liter of catalyst and per hour.

The gas was analyzed at the reactor outlet and the % converted carbon monoxide was determined as follows:

$$\% \text{ Conversions} = \frac{\text{No. of mols of a CO at inlet} - \text{No. of mols of CO at outlet}}{\text{No. of mols of CO at inlet}}$$

Examples 1 to 9 are given for illustrating the manufacture and the use of the unsupported catalysts.

EXAMPLE 1

100 g of $CrO_3$ are intimately admixed with 55.3 g of $CuCO_3, Cu(OH)_2$, and the resulting mixture is dissolved in 200 ml of water. 50 g of gum adraganth are slowly added to the resulting solution under constant stirring, so as to form a homogeneous gel of high viscosity.

After drying at 120°C, the product was heated for 90 minutes at 450°C in air. The X-ray analysis showed that there had been obtained the substantially pure $CuCr_2O_4$ spinel phase. This product was thereafter heated for 1 hour at 400°C in a gas stream of 98 % nitrogen and 2 % hydrogen. It was finally shaped to agglomerates of 5 mm diameter.

EXAMPLE 1 A 120.8 g of $Cu(NO_3)_2$ $3H_2O$ and 400.1 g of $Cr(NO_3)_3$ 9 $H_2O$ have been dissolved in their water of crystallization and heated in air at 450°C for 90 minutes. An X-ray analysis has shown that the manufactured sample consisted essentially of $Cr_2O_3$ and $CuO$ with a small amount of $Cu Cr_2O_4$. The product was then heated for 1 hour at 300°C in a gas stream of 98 percent nitrogen and 2 percent hydrogen. It was finally shaped to agglomerates of 5 mm diameter.

EXAMPLE 1 B 120.8 g of $Cu(NO_3)_2$ 3 $H_2O$ have been heated at 450°C for 90 minutes in air and thus transformed to $CuO$; the latter was heated at 300°C for 90 minutes in the same gas stream as in example 1 and finally shaped to agglomerates of 5 mm diameter.

EXAMPLE 2

404 g of Fe $(NO_3)_3$ 9 $H_2O$ have been admixed with 55.25 g of $CuCO_3$ $Cu(OH)_2$, and 300 ml of water were added thereafter. The mixture was heated up to 80°C; once $CO_2$ was evolved, 60 g of gum adraganth were added slowly under constant and efficient stirring.

The resulting gel was heated at 450°C in air for 2 hours. The X-ray analysis showed a substantially pure $CuFe_2O_4$ phase.

After heating at 400°C for 90 minutes in a gas stream of 98 % $N_2$ and 2 % $H_2$, the product was shaped to agglomerates of 5 mm diameter and 5 mm height.

EXAMPLE 3

375.1 g of $Al(NO_3)_3$, 9 $H_2O$ have been admixed with 55.25 g of $CuCO_3$ $Cu (OH)_2$ and 300 ml of water added thereto. The mixture was heated at 80°C and when the gas evolution was terminated 60 g of gum adraganth were added to the well-stirred solution.

The dehydrated product was heated in air at 650°C for 2 hours, thus resulting in the $Cu Al_2O_4$ phase.

EXAMPLE 4

404 g of Fe $(NO_3)_3$ 9 $H_2O$, 100 g of $CrO_3$ and 110.5 g of $CuCO_3$ $Cu(OH)_2$ have been admixed with 500 ml of water.

The mixture was heated at 80°C up to complete dissolution, and 100 g of gum adraganth were added thereto.

The resultant viscous product was heated at 450°C for 90 minutes.

The X-ray analysis showed the phase $CuFe_2O_4$, $CuCr_2O_4$. After 90 minutes treatment at 400°C in a gas stream of 98 percent $N_2$ and 2 percent $H_2$, the product was shaped to cylinders of 5 mm diameter and 5 mm height.

The catalysts of examples 1 to 4 have been tested and the results are summarized in table I.

TABLE 1

| Example | Temperature °C | after 1 hour | % CO conversion after 10 hours | after 100 hours |
|---------|---------------|--------------|-------------------------------|-----------------|
| 1       | 220           | 97           | 95                            | 94              |
| 1 A     | 220           | 88           | 74                            | 60              |
| 1 B     | 220           | 87           | 60                            | 30              |
| 2       | 220           | 93           | 92                            | 90              |
| 3       | 240           | 91           | 90                            | 89              |
| 4       | 220           | 97           | 95                            | 94              |

The catalysts of examples 1 to 4 have been heated to 420°C for 24 hours in a gas stream of 4 percent $H_2$ and 96 percent nitrogen. They were used thereafter under the same conditions as before: their activity loss with respect to the carbon monoxide conversion reaction after these 24 hours was lower than 2 percent.

EXAMPLE 5

49.8 g of copper carbonate $CuCO_3$ $Cu(OH)_2$ and 8.6 g of cadmium carbonate $CdCO_3$ were caused to dissolve in 150 ml of an aqueous solution of 100 g $CrO_3$ in water. 20 g of gum adraganth were added thereto, so as to form a homogeneous gel of high viscosity.

EXAMPLE 5 A

Example 5 was repeated, except that gum adraganth was omitted.

EXAMPLE 6

49.8 g of copper carbonate $CuCO_3$ $Cu(OH)_2$ and 4.2 g of magnesium carbonate $MgCO_3$ have been caused to dissolve in 150 ml of an aqueous solution of 80 g of chromic anhydride $CrO_3$ and 75 g of aluminum nitrate $Al(NO_3)_3$ $9H_2O$. 40 g of Senegal gum were slowly added thereto, so as to form a gel of high viscosity.

EXAMPLE 7

49.8 g of copper carbonate $CuCO_3$ $Cu(OH)_2$ and 4.7 g of cobalt hydroxide were caused to dissolve in 150 ml of an aqueous solution of 100 g chromic anhydride $CrO_3$.

40 g of gum adraganth were slowly added thereto under constant stirring, thus resulting in a homogeneous gel of high viscosity.

EXAMPLE 8

49.8 g of copper carbonate $CUCO_3$ $Cu(OH)_2$ and 8.6 g of cadmium carbonate $CdCO_3$ have been dissolved in 170 ml of an aqueous solution of 60 g chromic anhydride $CrO_3$ and 80.8 g iron nitrate $Fe(NO_3)_3$ $9H_2O$. 40 g of Senegal gum were added thereto.

The products of examples 5 to 8, which are catalyst precursors, have been dried at 120°C for 4 hours, then subjected to decomposition by heating at 550°C in an air stream for 4 hours. The resulting powders have been shaped to particles of 3 mm diameter and 3 mm height, and then heated at 300°C for 12 hours in a gas mixture of 97 percent by volume of nitrogen and 3 percent by volume of hydrogen.

Table II summarizes the results obtained with the catalysts of examples 5 to 8 after 2 hours and 100 hours, at the given temperatures. The third column ($T = 220°C$) summarizes the results obtained with the same catalysts after 24 hours heating at 550°C in a gas stream of 4 percent by volume of hydrogen and 96 percent by volume of nitrogen.

It gives the percent spinel content of the active phase, said content being determined by X-rays analysis. It also gives the stability thereof as determined by the % by weight of copper which dissolves when a catalyst sample in admixed with nitric acid of density 1.38 at 30°C for 5 hours.

Silica extrudates having a pore volume of 50 ccm per 100 grams have been impregnated twice with this solution at 80°C, the impregnations being separated by a drying step.

The resulting product has been roasted at 550°C for 4 hours in an air stream.

TABLE II

| Examples | % by weight of spinel in the active phase | % copper loss | % CO conversion | | | | | |
|---|---|---|---|---|---|---|---|---|
| | | | T=220°C | | T=400°C | | T=220°C | |
| | | | after 2 h | after 100 h | after 2 h | after 100 h | after 2 h | after 100 h |
| 5 | 96 | 5 | 95 | 92 | 91 | 87 | 93 | 90 |
| 5 A | 40 | 65 | 92 | 88 | 84 | 49 | 21 | 17 |
| 6 | 95 | 5 | 94 | 90 | 91 | 86 | 92 | 88 |
| 7 | 90 | 4 | 95 | 92 | 91 | 85 | 93 | 90 |
| 8 | 94 | 7 | 93 | 90 | 91 | 87 | 91 | 88 |

Examples 9 to 12 are given for illustrating the manufacture and use of supported catalysts.

EXAMPLE 9

6 g of citric are added to 150 ml of an aqueous solution of 100 g chromic anhydride $CrO_3$ and 55.2 g copper carbonate $CuCO_3$ $Cu(OH)_2$. This solution is used to impregnate in two steps with intermediate drying alumina balls of 2-5 mm size, 50 ccm per 100 gram pore volume and 350 m²/g specific surface.

The impregnated balls have been heated in air at 550°C for 4 hours. The catalyst was finally tested at a VVH of 1500 h⁻¹.

EXAMPLE 9 A

Example 9 was repeated except that no citric acid was used. The catalyst was heated for 4 hours at 450°C and tested under the conditions of example 9.

EXAMPLE 12

225 g of aluminum nitrate $Al(NO_3)_3$ 9 $H_2O$, 161.6 g of iron nitrate $Fe(NO_3)_3$ 9 $H_2O$ and 55.2 g of copper carbonate $CuCO_3$ $Cu(OH)_2$ have been dissolved in 100 ml of water at 80°C. After complete dissolution, 10 g of citric acid have been added thereto. This solution has been used to impregnate in two steps with intermediate drying, silicon carbide balls of 2-5 mm size and 45 ccm per 100 g pore volume. Then the balls have been heated at 550°C in air for 4 hours.

Table III summarizes the main characteristics of the catalysts according to examples 9 to 12:
- percent by weight of active phase and carrier
- percent by weight of spinel in the active phase
- percent copper loss after 5 hours treatment with nitric acid of specific gravity 1.38 at 30°C.

It also summarizes the results obtained at 220°C and 400°C. The third column of results ($T = 220°C$) summarizes the results obtained with the catalysts after 24 hours treatment at 550°C in a gas stream consisting of 4 percent by volume of hydrogen and 96 % by volume of nitrogen.

TABLE III

| Examples | % by weight of active phase | % by weight of spinel in the active phase | % copper loss | % CO conversion | | | | | |
|---|---|---|---|---|---|---|---|---|---|
| | | | | T = 220°C | | T = 400°C | | T = 220°C | |
| | | | | after 2 h | after 100 h | after 2 h | after 100 h | after 2 h | after 100 h |
| 9 | 40 | 92 | 9 | 94 | 90 | 90 | 85 | 92 | 88 |
| 9 A | 40 | 30 | 73 | 87 | 83 | 82 | 36 | 19 | 15 |
| 10 | 38 | 91 | 10 | 93 | 89 | 89 | 86 | 91 | 87 |
| 11 | 32 | 85 | 12 | 93 | 88 | 89 | 81 | 91 | 86 |
| 12 | 38 | 89 | 11 | 91 | 87 | 88 | 82 | 89 | 85 |

EXAMPLE 10

49.8 g of copper carbonate $CuCO_3$ $Cu(OH)_2$ and 6.4 g of cadmium oxide CdO have been dissolved in 170 ml of an aqueous solution of 80 g of chromic anhydride and 50.2 g of manganese nitrate $Mn(NO_3)_2$ 4 $H_2O$. 8 g of tartaric acid were added thereto.

Alumina balls of 2-5 mm size and with a pore volume of 70cm per 100 g, whereof 20 cm³ of macropore volume, have been impregnated with the above solution. After drying the balls were heated in air at 550°C for 4 hours.

EXAMPLE 11

375.1 g of aluminum nitrate $Al(NO_3)_3$ 9 $H_2O$ and 55.25 g of copper carbonate $CuCO_3$ $Cu(OH)_2$ have been dissolved in 200 ml of water at 80°C. 6 g of gum adraganth have been added thereto.

What we claim is:

1. A process for manufacturing hydrogen by reacting carbon monoxide with steam at a temperature of from 150° to 450°C and in the presence of a catalyst comprising a mixed oxide of (a) copper and (b) at least one trivalent metal selected from the group consisting of aluminum, chromium, manganese, iron and cobalt, at least 60% by weight of said mixed oxide having a spinel structure.

2. A process as claimed by claim 1 wherein more than two metal elements are present in said mixed oxide.

3. A process as claimed by claim 1 wherein said mixed oxide essentially has the spinel structure.

4. A process as claimed by claim 1 said mixed oxide further comprising at least one bivalent metal selected from the group consisting of magnesium, cobalt and cadmium.

5. A process as claimed by claim 4, wherein said mixed oxide essentially has the spinel structure.

6. A process as claimed in claim 1 wherein said catalyst is a shaped particulate agglomerated catalyst consisting essentially of said mixed oxide.

7. A process as claimed by claim 6, wherein said mixed oxide essentially has the spinel structure.

8. A process as claimed by claim 4, wherein said catalyst is a shaped particulate agglomerated catalyst consisting essentially of said mixed oxide.

9. A process as claimed by claim 8, wherein said mixed oxide essentially has the spinel structure.

10. A process as claimed by claim 1, wherein said catalyst consists essentially of particulate carrier material impregnated with said mixed oxide.

11. A process as claimed by claim 10, wherein said mixed oxide essentially has the spinel structure.

12. A process as claimed by claim 4, wherein said catalyst consists essentially of particulate carrier material impregnated with said mixed oxide.

13. A process as claimed by claim 12, wherein said mixed oxide essentially has the spinel structure.

14. A process according to claim 1, wherein said catalyst is produced by a process comprising forming a solution containing (a) a dissolved copper compound selected from the group consisting of salts and hydroxides thereof and (b) a dissolved compound of a trivalent metal selected from the group consisting of aluminum, chromium, manganese, iron and cobalt, said compound being a salt, anhydride, acid or hydroxide; admixing to said solution a thermally decomposable gel-forming compound to obtain a homogeneous and transparent gel; heating the resultant gel up to at least 200°C to decompose the same and form a finely divided powder of a mixed oxide having at least 60% by weight of the spinel structure; and shaping said finely divided powder to agglomerate.

15. A process according to claim 1, wherein said catalyst is produced by a process comprising contacting said carrier with a thermally decomposable gel-forming compound or complexing aliphatic hydroxy carboxylic acid and a solution of (a) a dissolved copper compound selected from the group consisting of salts and hydroxides thereof and (b) a dissolved compound of a trivalent metal selected from the group consisting of aluminum, chromium, manganese, iron and cobalt, said compound being a salt, anhydride, acid, or hydroxide, evaporating solvent from the thus impregnated carrier, and heating the carrier up to at least 200°C to obtain a supported catalyst having a active phase of mixed oxide having at least 60% by weight of a spinel structure.

16. A process according to claim 1, wherein said catalyst is produced by a process comprising forming a solution containing (a) a dissolved copper compound selected from the group consisting of salts and hydroxides thereof and (b) a dissolved compound of a trivalent metal selected from the group consisting of aluminum, chromium, manganese, iron and cobalt, said compound being a salt, anhydride, acid or hydroxide; admixing to said soalution a thermally-decomposable complex-forming aliphatic hydroxy carboxylic acid, and concentrating the resulting solution to form a concentrate which is either viscous, homogeneous liquid or an amorphous solid; heating said concentrate up to at least 200°C. to decompose the same and form a finely divided powder of a mixed oxide having at least 60 percent by weight of the spinel structure; and shaping said finely divided powder to agglomerate.

17. A process as defined by claim 14, said solution further containing a dissolved compound of a divalent metal selected from the group consisting of magnesium, cobalt and cadmium.

18. A process as defined by claim 15, said solution further containing a dissolved compound of a divalent metal selected from the group consisting of magnesium, cobalt and cadmium.

19. A process as defined by claim 16, said solution further containing a dissolved compound of a divalent metal selected from the group consisting of magnesium, cobalt and cadmium.

* * * * *